(No Model.)

C. JACKSON.
ROASTING AND BAKING PAN.

No. 288,640. Patented Nov. 20, 1883.

WITNESSES

INVENTOR
Charles Jackson
by C. A. Snow & Co.
Attorneys.

N. PETERS, Photo-Lithographer, Washington, D. C.

United States Patent Office.

CHARLES JACKSON, OF CALIFORNIA, OHIO.

ROASTING AND BAKING PAN.

SPECIFICATION forming part of Letters Patent No. 288,640, dated November 20, 1883.

Application filed January 5, 1883. Renewed August 25, 1883. (No model.)

*To all whom it may concern:*

Be it known that I, CHARLES JACKSON, a citizen of the United States, residing at California, in the county of Hamilton and State of Ohio, have invented a new and useful Roasting and Baking Pan, of which the following is a specification, reference being had to the accompanying drawings.

This invention relates to baking-pans; and it consists in certain improvements in the construction of the same, which will be hereinafter fully described, and particularly pointed out in the claim.

Figure 1:
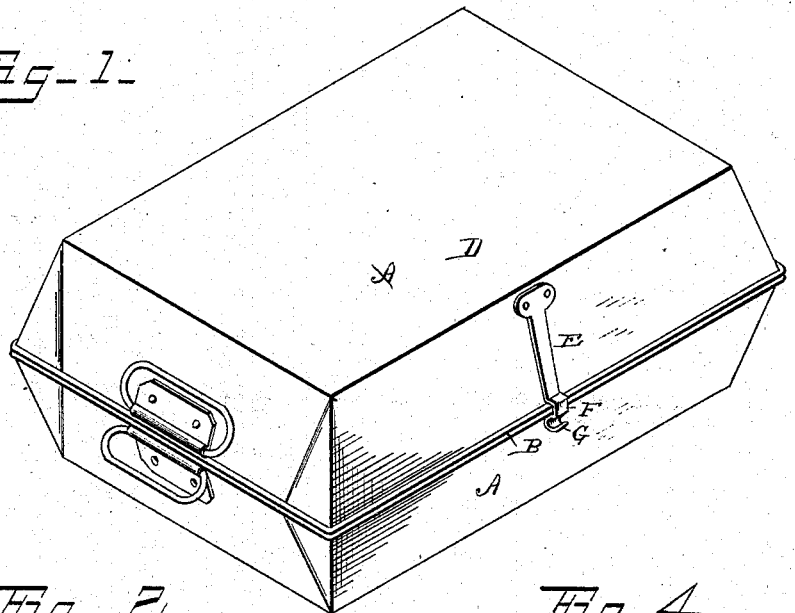
Figure 2:
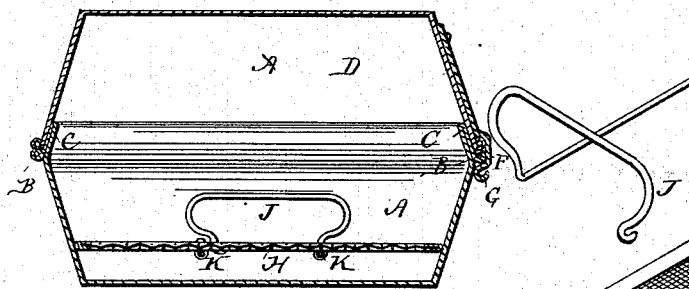
Figure 4:
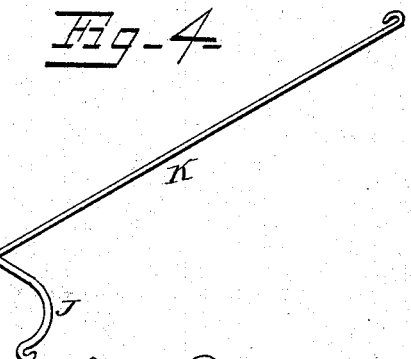
Figure 3:
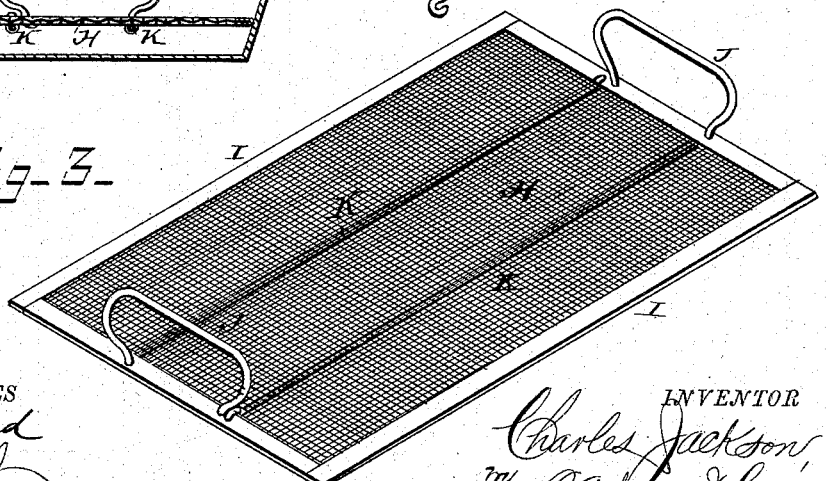

In the drawings hereto annexed, Figure 1 is a perspective view of my improved baking-pan complete. Fig. 2 is a transverse vertical sectional view of the same. Fig. 3 is a perspective view of the sieve, detached. Fig. 4 is a perspective view of one of the handles of the latter.

The same letters refer to the same parts in all the figures.

A represents a baking-pan of ordinary construction, provided above its rim B with an upwardly-projecting inwardly-inclined flange, C. D is another pan, inverted over the pan A, fitting over the flange C, and resting upon the rim B of the said pan. E is a flat spring, riveted or otherwise secured to the side of the pan D, and having its lower end bent so as to form a catch, F, and a handle, G, of substantially the form shown in the drawings, by reference to which it will be seen that when the pan D is placed in position the catch F will take around the rims B of the two pans, thus holding them securely together.

H is a flat sieve or screen, made of galvanized wire or other suitable material, bound with sheet metal, as shown at I, and made of such a size as to fit in the pan A, in which it is supported, a short distance above the bottom of said pan, upon the inclined sides of the latter. The sieve H is provided at each end with a bail or handle, J, formed of wire, one end of which extends through the binding and longitudinally under the sieve, so as to form a brace, K, the end of which is secured to the binding at the opposite end of the sieve. In this manner two longitudinal braces are formed, which prevent the body of the sieve from sagging. The sieve may be lifted out of the pan by the handles J J.

From the foregoing description, taken in connection with the drawings hereto annexed, the operation and advantages of my invention will be readily understood. The article to be cooked, being supported upon the sieve G, escapes contact with the bottom of the pan, and is thus prevented from burning. The sieve, with the cooked article, may be readily lifted out by my improved lifters. The pans are kept together by the spring catch or holder, which may be readily released when it is desired to separate the said pans.

My improved baking-pan is simple, durable, and convenient.

I claim as my invention and desire to secure by Letters Patent of the United States—

The combination, with a bake-pan constructed substantially as described, of the screen provided at each end with a bail or handle formed of a wire, one end of which extends through the binding of said screen and longitudinally under the same, so as to form a brace, and fastened to the binding at the opposite end of the screen, as set forth.

In testimony that I claim the foregoing as my own I have hereto affixed my signature in presence of two witnesses.

CHAS. JACKSON.

Witnesses:
 REUBEN TYLER,
 C. F. VENT.